United States Patent
Wood

(10) Patent No.: US 9,334,976 B1
(45) Date of Patent: May 10, 2016

(54) AUTOMATIC SHUT-OFF VALVE WITH CLOSURE RATE CONTROL

(71) Applicant: Graken Corp, Torrance, CA (US)

(72) Inventor: Graham P. Wood, Torrance, CA (US)

(73) Assignee: Graken Corp., Torrance, CA (US)

( * ) Notice: Subject to any disclaimer, the term of this patent is extended or adjusted under 35 U.S.C. 154(b) by 0 days.

(21) Appl. No.: 14/083,076

(22) Filed: Nov. 18, 2013

(51) Int. Cl.
*E03B 9/02* (2006.01)
*F16K 17/34* (2006.01)
*E03B 9/06* (2006.01)
*F16K 17/36* (2006.01)
*F16K 31/12* (2006.01)

(52) U.S. Cl.
CPC . *F16K 17/34* (2013.01); *E03B 9/06* (2013.01); *F16K 17/366* (2013.01); *F16K 31/12* (2013.01); *Y10T 137/5491* (2015.04)

(58) Field of Classification Search
CPC .......... E03B 9/06; E03B 9/02; F16K 17/366; F16K 17/34; F16K 31/12; A62C 35/20
See application file for complete search history.

(56) References Cited

U.S. PATENT DOCUMENTS

| | | | | |
|---|---|---|---|---|
| 2,736,903 | A * | 3/1956 | Wolf et al. | 4/399 |
| 2,980,125 | A | 4/1961 | Grant et al. | |
| 3,586,019 | A * | 6/1971 | Thomas et al. | 137/68.14 |
| 3,782,458 | A * | 1/1974 | Slack | 166/355 |
| 4,127,142 | A * | 11/1978 | Snider | 137/68.15 |
| 4,596,263 | A | 6/1986 | Snider | |
| 5,609,179 | A * | 3/1997 | Knapp | 137/68.16 |
| 5,758,682 | A | 6/1998 | Cain | |
| 5,791,366 | A | 8/1998 | Lo | |
| 5,941,268 | A * | 8/1999 | Ross, Jr. | 137/68.14 |
| 6,178,982 | B1 | 1/2001 | Longstreth | |
| 6,401,745 | B1 * | 6/2002 | Corder | 137/300 |
| 6,799,596 | B2 | 10/2004 | Liebert | |
| 7,156,119 | B2 * | 1/2007 | Freudendahl | 137/68.14 |
| 7,509,973 | B1 * | 3/2009 | Deive | 137/389 |
| 7,798,431 | B2 | 9/2010 | Eader | |
| 8,991,415 | B1 * | 3/2015 | Luppino | 137/68.14 |
| 2003/0150486 | A1 * | 8/2003 | Liebert | 137/68.14 |
| 2008/0196766 | A1 | 8/2008 | Gandy | |
| 2009/0145486 | A1 * | 6/2009 | Nguyen et al. | 137/242 |

* cited by examiner

*Primary Examiner* — Craig Schneider
*Assistant Examiner* — Kevin Barss
(74) *Attorney, Agent, or Firm* — Patent Law & Venture Gp.; Gene Scott

(57) ABSTRACT

A shut-off valve is mounted below a fire hydrant to automatically shut down water flow in case the hydrant is knocked over by a vehicle. The valve has a cylindrical enclosure open at both ends. A rotor is rotationally supported within the enclosure and movable linearly by rotation between a first, valve-open, and a second valve-closed, positions, the rotor acting to stopper the valve when in the valve-closed position. The rotor has plural buckets which cause the rotor to rotate when water flows through the enclosure and this rotation causes a screw action moving the rotor into the valve-closed position. Rotation is normally prevented by a restrictor plate resting in recesses on the valve. In this case the hydrant is able to receive water flow through the valve. When the hydrant is displaced it releases the restrictor plate allowing the stoppering action.

20 Claims, 4 Drawing Sheets

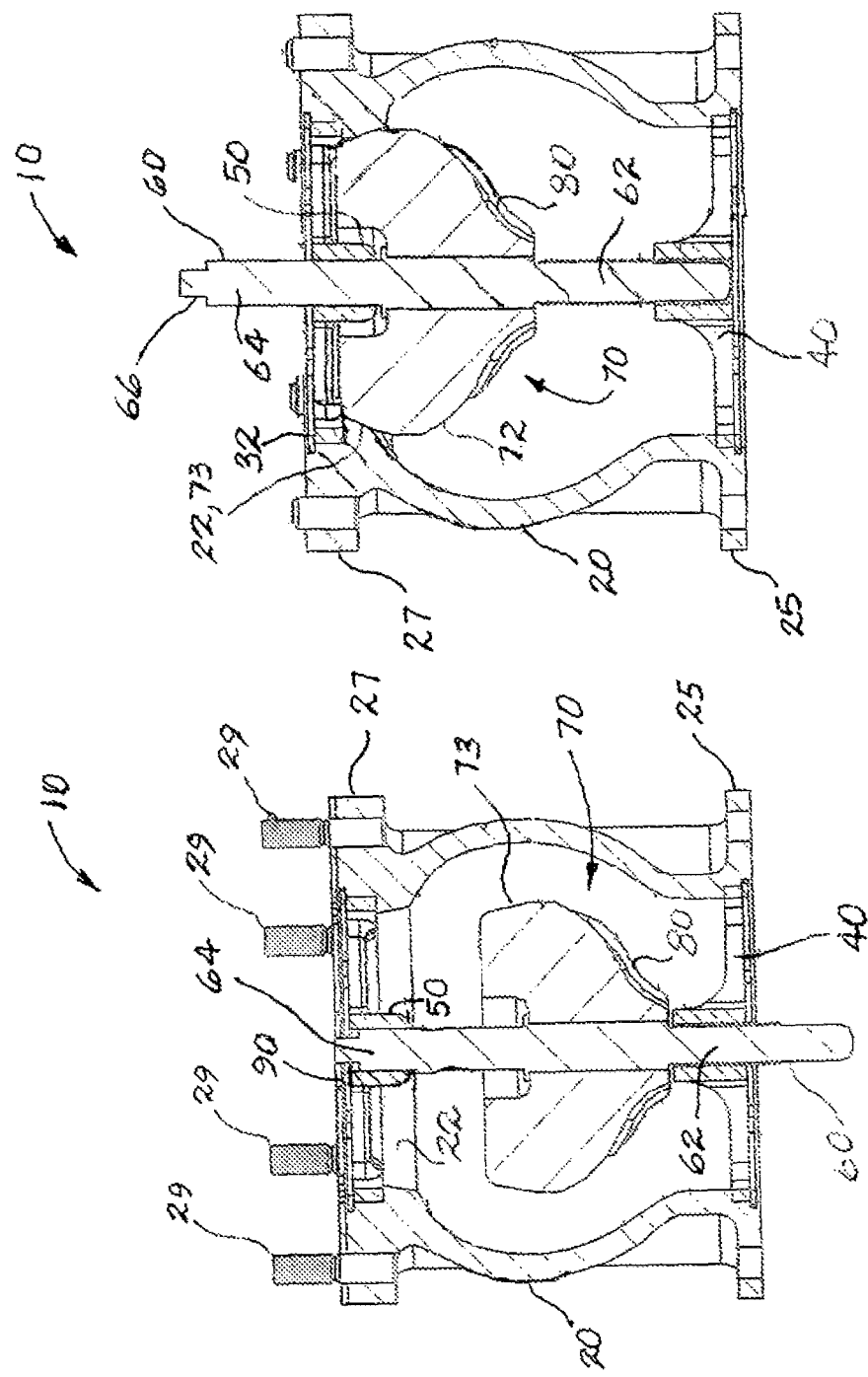

AUTOMATIC SHUT-OFF VALVE WITH CLOSURE RATE CONTROL

BACKGROUND

The technical field of this disclosure relates to automatic shut-off valves, and their methods of operation; and more particularly to a fire hydrant safety shut-off valve. Above ground, street mounted fire hydrants have been known to be broken away from their underground water supply systems when struck by a vehicle. In such cases, a large flow of water may be released from the water system into the street before system water can be shut off. A wet barrel hydrant is normally held at water system pressure all the time. Such hydrants are known to provide a breakaway interconnection with a water system riser, allowing the hydrant to break off from the water system riser upon collision, and thus minimizing damage to the water system's pipes and flanges and minimizing loss of water. It is known to provide a valve between a breakaway flange or breakaway riser and a water system riser which is able to stop the flow of water from the system upon a breakaway event, in some cases, backflow from the street takes place, so that contaminated water enters the water supply system. The prior art teaches both linear axial shutoff valves and flapper valves including dashpot dampened valves to lessen water hammer. What is not found in prior art hydrant automatic shutoff apparatus is a valve that is simple in design, mountable between a water system riser and a hydrant having a breakaway flange ring or riser, and which is able to act to prevent uncontrolled flow of system water from the broken hydrant system while acting also as a check valve to prevent backflow of contaminated water from running into the water system riser. Additionally the prior art does not teach valve closure rate control to avoid water hammer. The presently described valve and valve disclosure teaches a novel automatic shutoff valve with these features and which has other structural distinctions and benefits therefrom as will be explained.

BRIEF DESCRIPTION OF DRAWINGS

FIG. 3 is an example vertical section view thereof shown in an open state;

FIG. 4 is an example vertical section thereof shown in a closed state;

Like reference symbols in the drawing figures indicate like elements.

DETAILED DESCRIPTION

The presently described apparatus and method refers to a shut-off valve having a cylindrical valve body with a pair of axially aligned and spaced apart supports positioned at opposite ends of the body. A threaded rod of a rotor is engaged with a bushing in a lower support. The rotor has a plurality of peripheral buckets, paddles, vanes, or fins which are configured for producing rotational forces on the rotor when a fluid stream moves through the valve body. Normally the rod is secured from rotation and no rotational movement occurs so that the hydrant may be used in fire-fighting, etc. When the hydrant is dislodged by a vehicle collision for instance, the rod restraint is also dislodged. Water flow causes the rod and rotor to rotate and therefore move vertically upward until the rotor seats against a valve seating surface thereby closing the valve and halting flow. The shut-off valve uses a rotational turbine approach to drive the rotor home against its seat. Objectives of this valve include: extreme simplicity in construction and operation resulting in unlimited life, no changes in flow characteristics through the valve under nominal operating conditions, adaptable to above or below ground installation, and to new installations as well as replacement of damaged valves, not requiring special equipment for installation, valve closure rate proportional to fluid pressure and flow rate eliminating water hammer.

Figure 1:
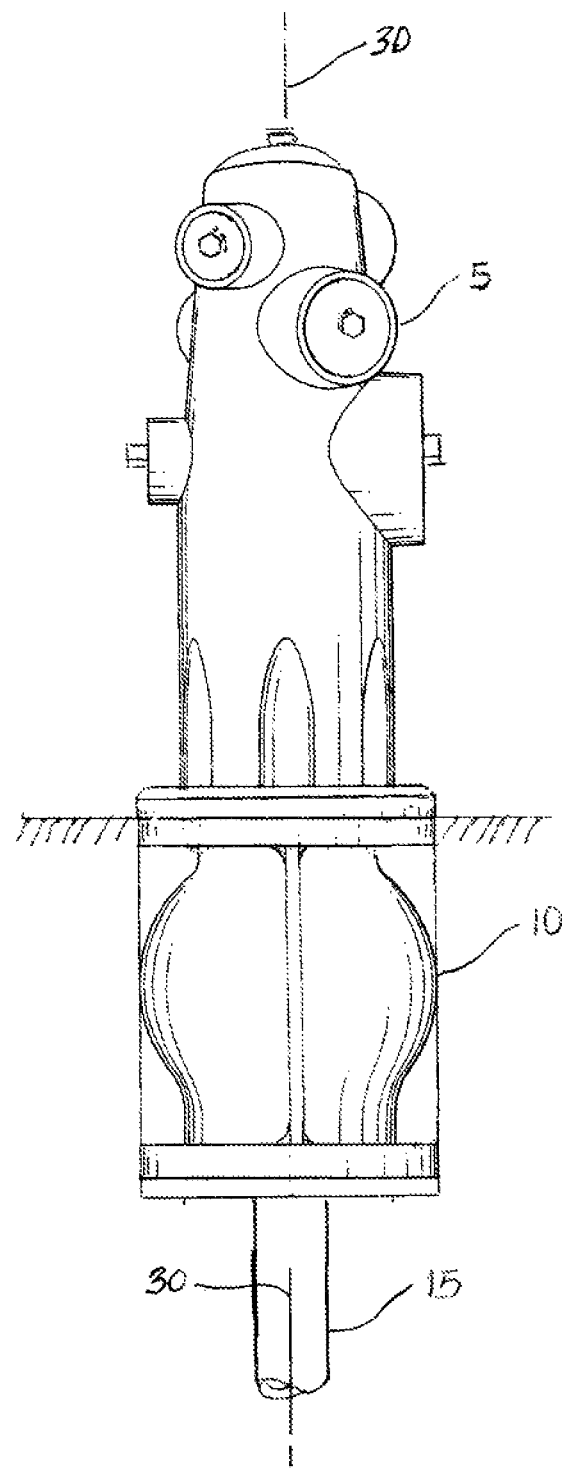
FIG. 1 is an example schematic diagram showing the presently described valve mounted on a water system riser and supporting a fire hydrant above.

FIG. 1 shows a fire hydrant 5 mounted on top of the presently described and claimed automatic shut-off valve 10, and further shows a riser 15 of a water supply system joined with valve 10 from below. Valve 10, then, is an intermediary apparatus used for normal transfer of water to hydrant 5 from riser 15, and also is capable of shutting down water flow from riser 15 when hydrant 5 is accidently displaced, that is, dislodged from valve 10. Common joining hardware is not shown in FIG. 1 but those of skill in the mechanical arts would be able to join elements 5, 10, and 15 without undue experimentation as will be recognized from the following description. Although valve 10 may be used as shown in FIG. 1 it may be advantageously used in alternate embodiments for a wide range of applications where an emergency shut-off of a fluid stream is necessary and especially where water hammer in a fluid supply system is to be avoided during emergency shutdown of flow.

Figure 2:
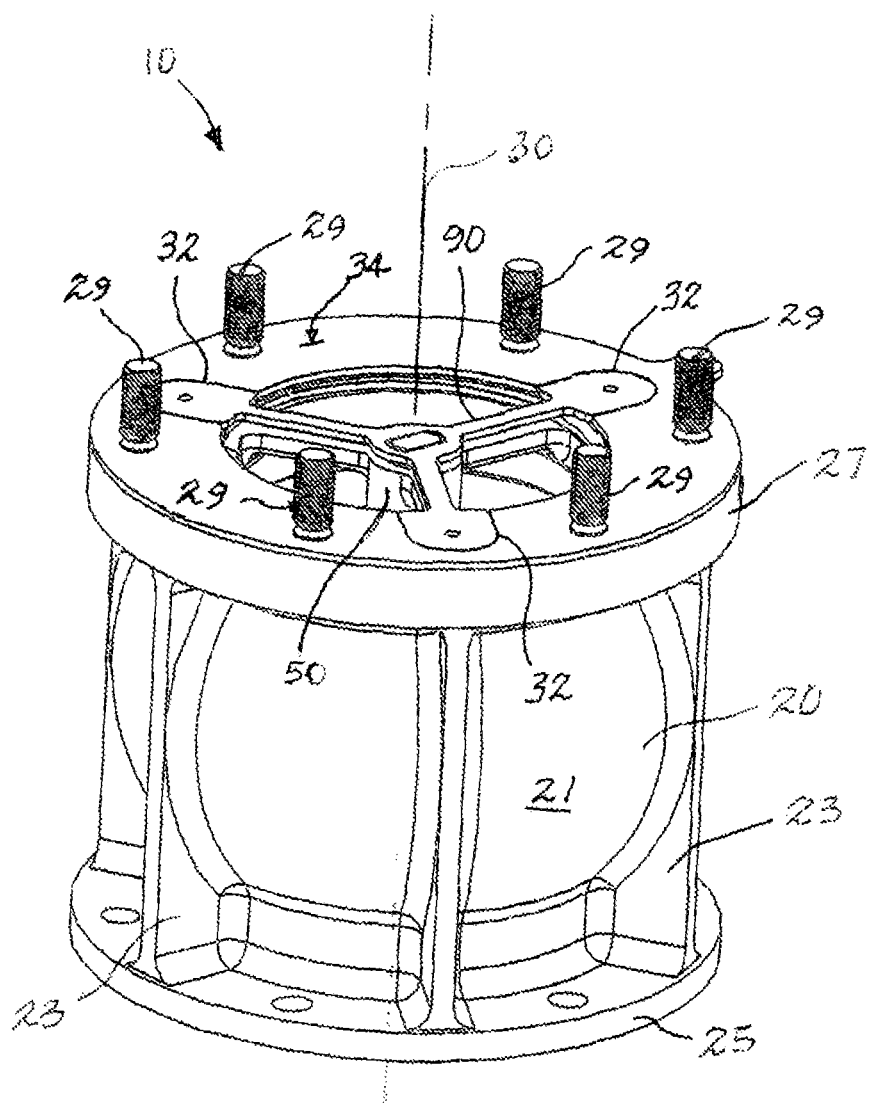
FIG. 2 is an example perspective view of said valve.

FIG. 2 shows that valve 10 may include a cylindrical enclosure 20 which may have a spherical or spherical-oblate wall 21. Wall 21 may be reinforced by webs, beams or stringers 23 positioned in parallel with a central axis 30. Enclosure 20 may have a bottom ring flange 25 and a top ring flange 27 which may be integrally engaged with wall 21 by casting or welding technique, or otherwise. Shown in FIGS. 1 and 2, valve 10 may be oriented so that axis 30 is vertical. Alternatively, in other applications, valve 10 may be oriented so that axis 30 is not-vertical, as for instance, valve 10 is able to function normally as described herein when axis 30 is in a horizontal attitude and valve 10 will also function normally when inverted.

Figure 5:
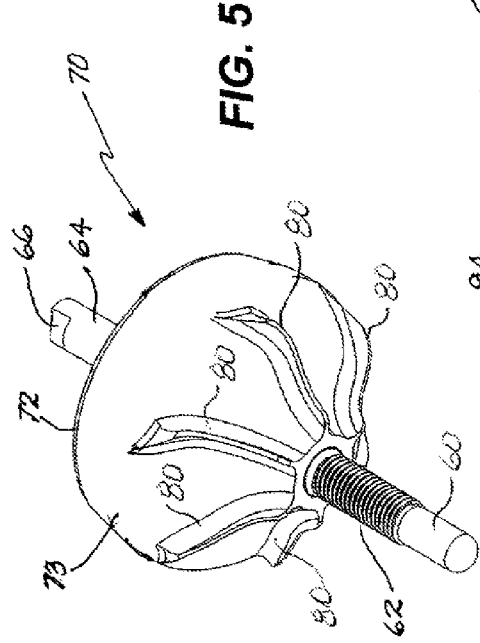
FIG. 5 is an example perspective view of a rotor thereof.

Referring to FIGS. 3 and 4, a pair of axially centered and spaced apart supports 40 and 50 are rigidly fastened to ring flanges 25, 27 respectively. As shown in FIG. 5, rotor 70 may have a centrally positioned and axially aligned rod 60 with a threaded lower portion 62 and a smooth rod upper portion 64, the rod 60 fixed within a rotor body 72. The upper end 66 of rod 60 is non-round or is flatted. As shown in FIG. 3, when rotor 70 is in a lower position within enclosure 20, rod lower portion 62 may be threadedly engaged with support 40 and rod upper portion 64 may be engaged with support 50. A plurality of buckets 80 may be mounted in radial, spaced apart positions around rotor body 72, each positioned and configured for producing rotational forces on rotor 70 when a fluid stream moves axially through enclosure 20 in the direction from flange 25 to flange 27. When such fluid flow occurs, rotor 70 rotates so that rod 60 drives rotor 70 upwardly until reaching the upper position shown in FIG. 4. In this position an annular sealing surface 73 of rotor body 72 seats against annular seating surface 22, a surface on the interior of enclosure 20. As shown in FIG. 4, surfaces 22 and 73 fit together tightly thereby sealing the interior of valve 10 so that fluid flow stops.

The top ring flange 27 may engage break-away threaded bolts 29 (FIGS. 2 and 3). In order to break away when hydrant 5 is dislodged without damaging flange 27, bolts 29 may be undercut, as shown, or may be of a frangible material (easily broken loose or sheared). Bolts 29 secure fire hydrant 5 to top ring flange 27. Should hydrant 5 be struck by a vehicle, bolts 29 will shear-off enabling hydrant 5 to be displaced without injury to valve 10 assuming valve 10 is below surface, as shown in FIG. 1, and without injury to hydrant 5 from bolts 29.

Bottom ring flange 25 may be joined, to system riser 15 using bolts. In the configuration show in FIG. 1, valve 10 may be positioned for conducting water from riser 15 into hydrant 5 during normal hydrant operations, and also provides a slow cutoff of water flow when hydrant 5 is displaced. When valve 10 is in the closed state (FIG. 4), water is not able to be exhausted from valve 10 nor is it able to enter through valve 10 into the water supply system riser 15 from above.

Figure 7:
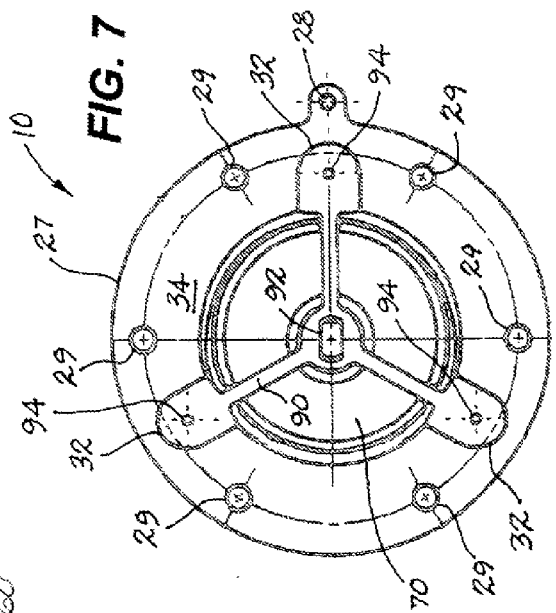
FIG. 7 is a top plan view thereof.
Figure 6:
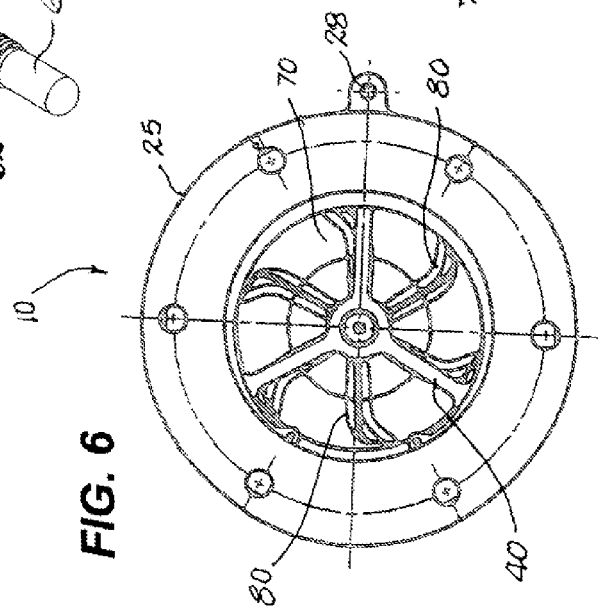
FIG. 6 is a bottom plan view thereof.

As shown in FIGS. 2 and 7 top ring flange 27 has three recesses 32 in its upwardly facing top surface 34. A three-legged restrictor plate 90 rests within the recesses 32 and has a non-round hole 92. As shown in FIGS. 3 and 7 the non-round rod end 66 of rod 60 is engaged within non-round hole 92 of restrictor plate 90 when rotor 70 is in its lower position which is shown in FIG. 3. In this position water or other fluid may flow from riser 15, through valve 10 and into hydrant 5.

Hydrant 5, when bolted in place (bolts 29) on top of top ring flange 27, it presses down on restrictor plate 90 pressing it into recesses 32. This prevents rod 60 from rotating. When hydrant 5 is displaced, restrictor plate 90 springs out of recesses 32 so that rod 60 is no longer prevented from rotating. This allows rotor 70 to rotate and move upwardly into the position shown in FIG. 4 thereby sealing valve 10 and preventing any fluids from leaving or entering valve 10. The fact that rotor 70 moves in the vertical direction relatively slowly prevents water hammer during valve closure. In an embodiment, restrictor 90 may be made of spring temper steel and in a concave shape. When pressed flat by hydrant 5 restrictor 90 engages recesses 32 preventing rotor rotation, but when released, the extremities of restrictor 90 move out of recesses 32 thereby enabling rotor 70 to rotate. In an embodiment, restrictor 90 may be wired to hydrant 5 using one or more of holes 94, shown in FIG. 7, so that as hydrant 5 moves away from valve 10 it pulls restrictor 90 out of recesses 32. In an embodiment, restrictor plate 90 may be attached to hydrant 5 by common hardware using mounting holes 94. In an embodiment restrictor 90 may be connected to hole 28 of flange 27 by a leash (not shown) to prevent restrictor 90 from flying away from valve 10 upon being released from recesses 32.

In an embodiment, a small unthreaded portion of the rod may be placed such that the valve is able to move axially without the resistance of the thread and the subsequent rotational motion; thereby allowing just the fluid pressure to propel the linear motion of the valve closure (without rotation) during the seating between the valve poppet and housing. Experimentation has revealed that a constant thread engagement may lead to a 'soft closure' event wherein seepage occurs. Additionally, the absence of thread in the final stage of closing ensures a tenacious seal occurs to aid in the successful anti-backflow feature.

Embodiments of the subject apparatus and method have been described herein. Nevertheless, it will be understood that modifications may be made without departing from the spirit and understanding of this disclosure. Accordingly, other embodiments and approaches are within the scope of the following claims.

What is claimed is:

1. A shut-off valve comprising:
   a cylindrical enclosure open at opposing ends thereof;
   a rotor rotationally supported within the enclosure and movable linearly by rotation between a first and a second positions therein, wherein, with the rotor in the first of the positions, the shut-off valve is in an open state, and wherein, with the rotor in the second of the positions, an annular sealing surface of the rotor is in contact with an annular seating surface of the enclosure thereby closing the shut-off valve;
   the rotor having plural buckets thereon, the buckets configured for rotating the rotor when a fluid moves through the enclosure and rotor motion is not restricted.

2. The valve of claim 1 wherein the rotor is threadedly engaged with a support fixed to the enclosure.

3. The valve of claim 1 wherein the enclosure has a spherical or spherical-oblate wall.

4. The valve of claim 1 wherein the enclosure wall is reinforced by stringers.

5. The valve of claim 3 wherein the enclosure has a bottom ring flange adapted for engagement with a water system riser, and further, the enclosure has a top ring flange adapted for engagement with a fire hydrant.

6. The valve of claim 5 wherein the ring flanges are cast integrally with the wall.

7. The valve of claim 5 wherein the top ring flange engages frangible threaded bolts for securing the fire hydrant.

8. The valve of claim 5 wherein the top ring flange has plural recesses in an upwardly facing top surface thereof.

9. The valve of claim 8 wherein a restrictor plate rests within the recesses of the top ring flange, the restrictor plate having a non-round axially-centered hole therein.

10. The valve of claim 5 wherein a non-round aspect of the rotor is engaged within the non-round hole of restrictor plate.

11. A shut-off valve and fire hydrant combination comprising:
    the fire hydrant engaged with a cylindrical enclosure of the valve, the enclosure open at opposing ends thereof;
    a rotor rotationally supported within the enclosure and movable linearly by rotation between a first and a second positions therein, wherein, with the rotor in the first of the positions, the shut-off valve is in an open state, and wherein, with the rotor in the second of the positions, an annular sealing surface of the rotor is in contact with an annular seating surface of the enclosure thereby closing the shut-off valve;
    the rotor having plural buckets thereon, the buckets configured for rotating the rotor when a fluid moves through the enclosure and rotor movement is not restricted.

12. The combination of claim 11 wherein the rotor is threadedly engaged with a support fixed to the enclosure.

13. The combination of claim 11 wherein the enclosure has a spherical or spherical-oblate wall.

14. The combination of claim 11 wherein the enclosure wall is reinforced by stringers.

15. The combination of claim 13 wherein the enclosure has a bottom ring flange adapted for engagement with a water system riser, and further, the enclosure has a top ring flange engaged with the fire hydrant.

16. The combination of claim 15 wherein the ring flanges are cast integrally with the wall.

17. The combination of claim 15 wherein the top ring flange has frangible threaded bolts securing the fire hydrant to the top ring flange.

18. The combination of claim 15 wherein the top ring flange has plural recesses in a top surface thereof, the top surface adjacent to the fire hydrant.

19. The combination of claim 18 wherein a restrictor plate rests within the recesses of the top ring flange, the restrictor plate having a non-round hole therein.

20. The combination of claim 19 wherein a non-round aspect of the rotor is engaged within the non-round hole of the restrictor plate whereby the rotor is able to rotate when the restructor plate is removed from the recesses.

\* \* \* \* \*